(12) United States Patent
Aldersley

(10) Patent No.: US 7,938,646 B2
(45) Date of Patent: May 10, 2011

(54) THREE-DIMENSIONAL PERIODIC TABLE

(76) Inventor: Michael F. Aldersley, Kingston, NY (US)

( * ) Notice: Subject to any disclaimer, the term of this patent is extended or adjusted under 35 U.S.C. 154(b) by 112 days.

(21) Appl. No.: 12/272,212

(22) Filed: Nov. 17, 2008

(65) Prior Publication Data

US 2009/0181351 A1 Jul. 16, 2009

Related U.S. Application Data

(63) Continuation of application No. 11/199,031, filed on Aug. 8, 2005, now abandoned.

(51) Int. Cl.
*G09B 23/24* (2006.01)
*B65D 85/67* (2006.01)
(52) U.S. Cl. .................... 434/282; 206/579
(58) Field of Classification Search .............. 434/282; 40/118; 206/579
See application file for complete search history.

(56) References Cited

U.S. PATENT DOCUMENTS 3,581,409 A * 6/1971 Alexander ............... 434/282
6,581,822 B1 * 6/2003 Garran ................... 229/116.4

* cited by examiner

*Primary Examiner* — Xuan M Thai
*Assistant Examiner* — Evan R Page
(74) *Attorney, Agent, or Firm* — Hiscock & Barclay, LLP

(57) ABSTRACT

The invention includes a three dimensional periodic table of the chemical elements and a method of learning about the periodic nature of the elements. Included are several cardboard or paper sheets, each having a plurality of blocks that display information about particular elements. The blocks are arranged in groupings of elements with similar properties, such as the transition Earth metals. Students follow a set of instructions provided with the sheets to cut out the groups, fold along particular lines, and affix tabs together to assemble several three dimensional forms. The students then place the forms on a planar map that indicates where to place each form and indicates how to follow the periods of elements between the forms.

12 Claims, 16 Drawing Sheets

Three-Dimensional Periodic Table.

THREE-DIMENSIONAL PERIODIC TABLE

CROSS REFERENCE TO RELATED APPLICATIONS

This is a continuation of U.S. patent application Ser. No. 11/199,031 filed Aug. 8, 2005.

FIELD OF THE INVENTION

This invention relates to a periodic table of the chemical elements as a tool for learning about the elements.

BACKGROUND OF THE INVENTION

It is generally accepted in physics and chemistry that the universe is made up of a number of stable and less stable elements ranging in progressive units of atomic masses. The periodic law states that the properties of the chemical elements and their compounds are a periodic function of their atomic number. The periodic table is a table of the elements written in sequence in the order of atomic number and arranged in horizontal rows (periods) and vertical columns (groups) to illustrate the occurrence of similarities in the properties of the elements as a periodic function of the sequence. Present versions of the table used in texts have remained essentially unchanged for the past fifty years, except for the addition of new elements.

Every chemistry laboratory and classroom has a periodic table displayed. It can be difficult, however, to engage students to learn about the elements with a conventional periodic table. Also, the significance of the natural grouping of elements shown by the periodic table may be lost on many students, and some heavier elements might be completely ignored. Therefore a periodic table of the elements and a method of learning about the elements that engage students to learn about the elements, including the most unusual of them, and that helps students see the groupings of the elements within the table are needed.

U.S. Pat. No. 3,581,409, by Roy H. Alexander teaches a three dimensional symbolic representation of the elements with fully grouped families including the Rare Earth series is presented in which the symbolic representations of the elements are arranged contiguously and continuously according to the atomic number. Alexander teaches an arrangement of the elements that includes a single three dimensional form with the elements arranged according to atomic number and without interruption of the atomic number. Therefore a three dimensional representation of the elements with multiple three dimensional forms to be assembled and which challenges a student to thereby encourage learning about the elements is needed.

U.S. Pat. No. 4,199,876, by Gerson Katz teaches a device for displaying a periodic table of the chemical elements. Katz's table includes four detachable, coaxially mounted cylinders. Each cylinder is divided into an upper cylindrical section and a lower cylindrical section. The sections are also detachably mounted. The upper surfaces of each of the cylindrical sections are marked with discrete sectors containing indicia that denote the chemical elements. The device can also be used to determine n and 1 numbers of quantum theory for selected elements. An aid that has a transverse surface marked to correspond to the discrete sectors on the upper surfaces of the cylindrical sections is used to determine $m_l$ and $m_s$ numbers of quantum theory for selected elements. A second device for displaying the periodic table of the elements is in the form of four detachable, concentrically mounted spheres. The surface of each of the spheres is divided into an upper hemisphere and a lower hemisphere. The hemispheres are preferably detachably mounted. The outer surface of each of the hemispheres is marked with discrete sectors containing indicia that denote the chemical elements. The tables taught by Katz do not readily depict the natural groupings of the elements, such as the transition metals and alkaline groups. Further, since the spheres taught by Katz are concentrically mounted, the inner spheres are at least partially concealed by the outer spheres. Therefore an improved three dimensional periodic table that readily displays the natural groupings of the elements and which does not conceal information about any of the elements is needed.

SUMMARY OF THE INVENTION

The invention comprises, in one form thereof, a three dimensional periodic table of the chemical elements and a method of learning about the periodic nature of the elements. The invention comprises several cardboard or paper sheets, each having a plurality of blocks that display information about particular elements. The blocks are arranged in groupings of elements with similar properties, such as the transition Earth metals. Students follow a set of instructions provided with the sheets to cut out the groups, fold along particular lines, and affix tabs together to assemble several three dimensional forms. The students then place the forms on a planar map that indicates where to place each form and indicates how to follow the periods of elements between the forms.

More particularly, the invention includes a periodic representation of the elements, which comprises a plurality of three-dimensional forms, and a plurality of element representations displayed on each of the forms. Each of the element representations displays information about a particular element and the three dimensional forms are displayed in proximity to each other on a planar map such that all of the forms may be viewed together.

In another form, the invention includes a periodic representation of the elements, which comprises a plurality of planar sheets, a plurality of element representations printed on each of the sheets in one or more groupings, and a plurality of tabs in communication with each of the groupings.

In a further form, the invention includes a kit for assembling a three-dimensional periodic representation of the elements, which comprises a plurality of planar sheets, a plurality of element representations printed on each of the sheets in one or more groupings, a plurality of tabs in communication with each of the groupings, and a set of instructions for cutting out the groupings from the sheets and assembling the groupings into a plurality of three-dimensional forms.

In an even further form, the invention includes a method of teaching a student about the elements. The method comprises the steps of obtaining a plurality of planar sheets, each of which include a plurality of element representations printed thereon in one or more groupings and a plurality of tabs in communication with each of the groupings. A set of instructions is followed for creating a plurality of three-dimensional forms from the sheets. The groupings are cut out from the sheets according to the instructions and assembled into the three-dimensional forms. The student then observes the element representations of common and uncommon elements as well as the groupings of element representations, which display information about elements having similar properties.

An advantage of the present invention is that the three dimensional periodic table and method of learning about the elements engage students to learn about the elements, including the most unusual of them, and helps students see the groupings of the elements within the table. The instant periodic table also displays information about the elements on several three dimensional forms without concealing any of the information. In addition to learning about chemistry, students learn about working in groups and other important life skills.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein:

FIGS. 7-16 are isometric views of the groupings of element representations in various stages of assembly.

Corresponding reference characters indicate corresponding parts throughout the several views. The example set out herein illustrates one embodiment of the invention but should not be construed as limiting the scope of the invention in any manner.

DETAILED DESCRIPTION

Figure 1:
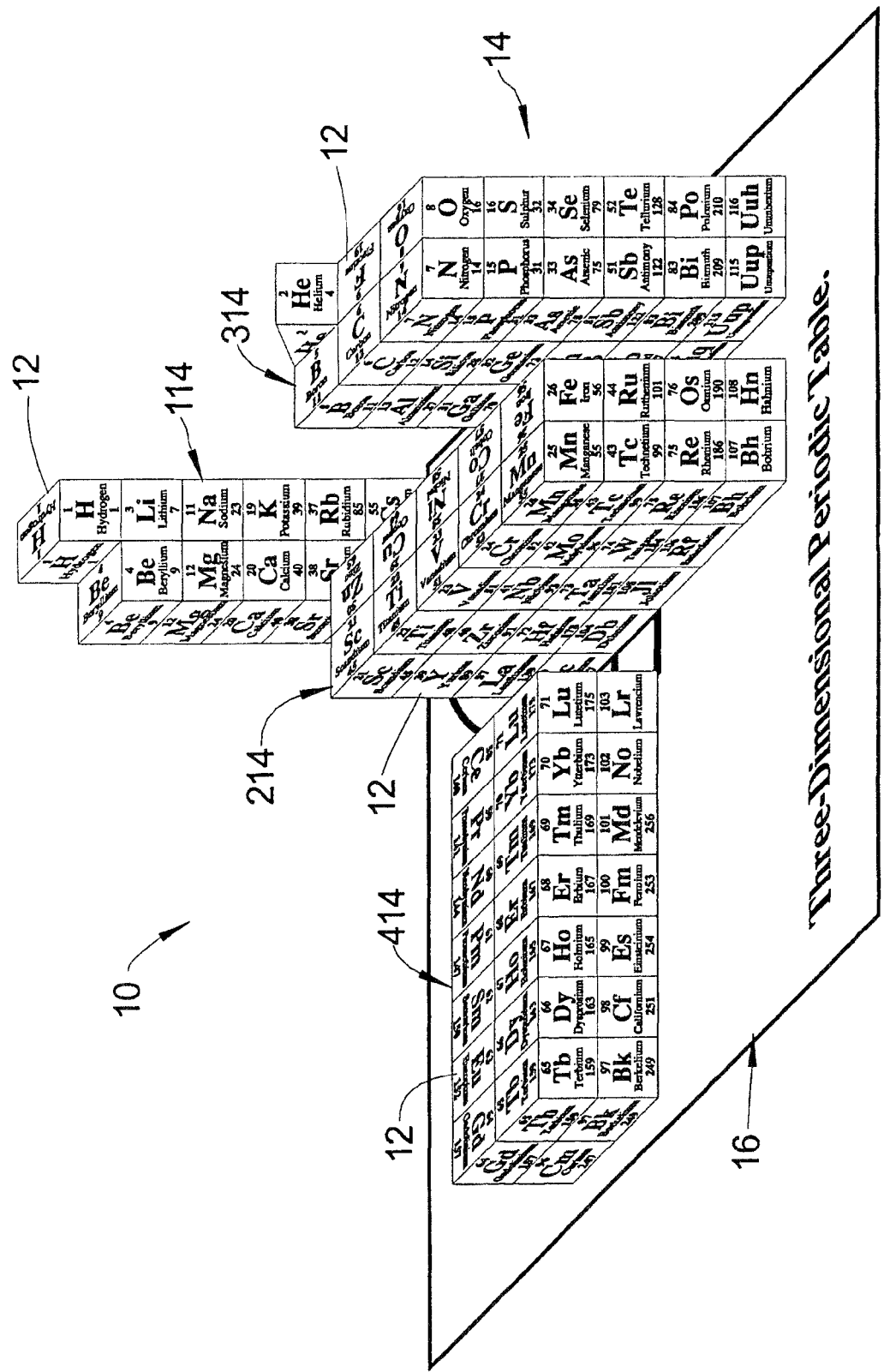
FIG. 1 is an isometric view of the three dimensional periodic table of the chemical elements of the present invention.

Referring to FIG. 1, there is shown the three dimensional periodic table of the chemical elements of the present invention. The three dimensional periodic table 10 includes a plurality of element representations 12, arranged in a plurality of groupings 14, which are shown in assembled three dimensional forms in FIG. 1, and a substantially planar map 16.

The element representations 12 are substantially rectangular in shape and include information about the element, such as the atomic number, the chemical symbol, the atomic mass, the element name, the natural state of the element at room temperature and atmospheric pressure, and the number of valence electrons. The element representations 12 may also be color-coded to indicate properties of the element. For example, the element representations 12 may be colored according to whether they are metals, metalloids, or non-metals. Alternatively, the element representations 12 may be colored according to the state of matter of the element for a particular temperature and pressure. In a further alternative, the element representations 12 are colored according to the color of the element, the compound, or the flame colors. Even further, the element representations 12 may be colored according to a particular design that is pleasing to the eye or attention grabbing. Certain element representations 12 on the edges of the three dimensional groupings 14, such as those for Carbon (C)and Nitrogen (N), have multiple faces that are angled at about 90° from each other in order to promote the idea that the element representations 12 are three dimensional blocks.

The groupings 14 are shown in substantially two dimensional nets in FIGS. 2-5. The planar nets are printed on sheets of paper with one or more groupings 14 on each sheet. In the present embodiment, the paper is a card-type paper of a weight that may be cut with scissors yet requires score lines for folding. Alternatively, paper having more or less flexibility may be used. Further, alternative materials such as certain plastics may be used in place of paper. Each of the groupings 14 includes a plurality of tabs 18 that may be glued to the underside of certain element representations 12 or to other tabs 18 for assembly of the three dimensional forms. The groupings 14 may include blank portions to fill in the three dimensional forms. Additional element representations 12 corresponding to newly discovered elements may be added to the blank portions at a later date. The layout of the element representations 12 and tabs 18 in the nets shown in the figures are by way of example and myriad alternative layouts may be imagined. Also, element names and positions may need to be changed in the future according to changes in standards, such as those set by the International Union of Pure and Applied Chemistry (TUPAC).

Figure 2:
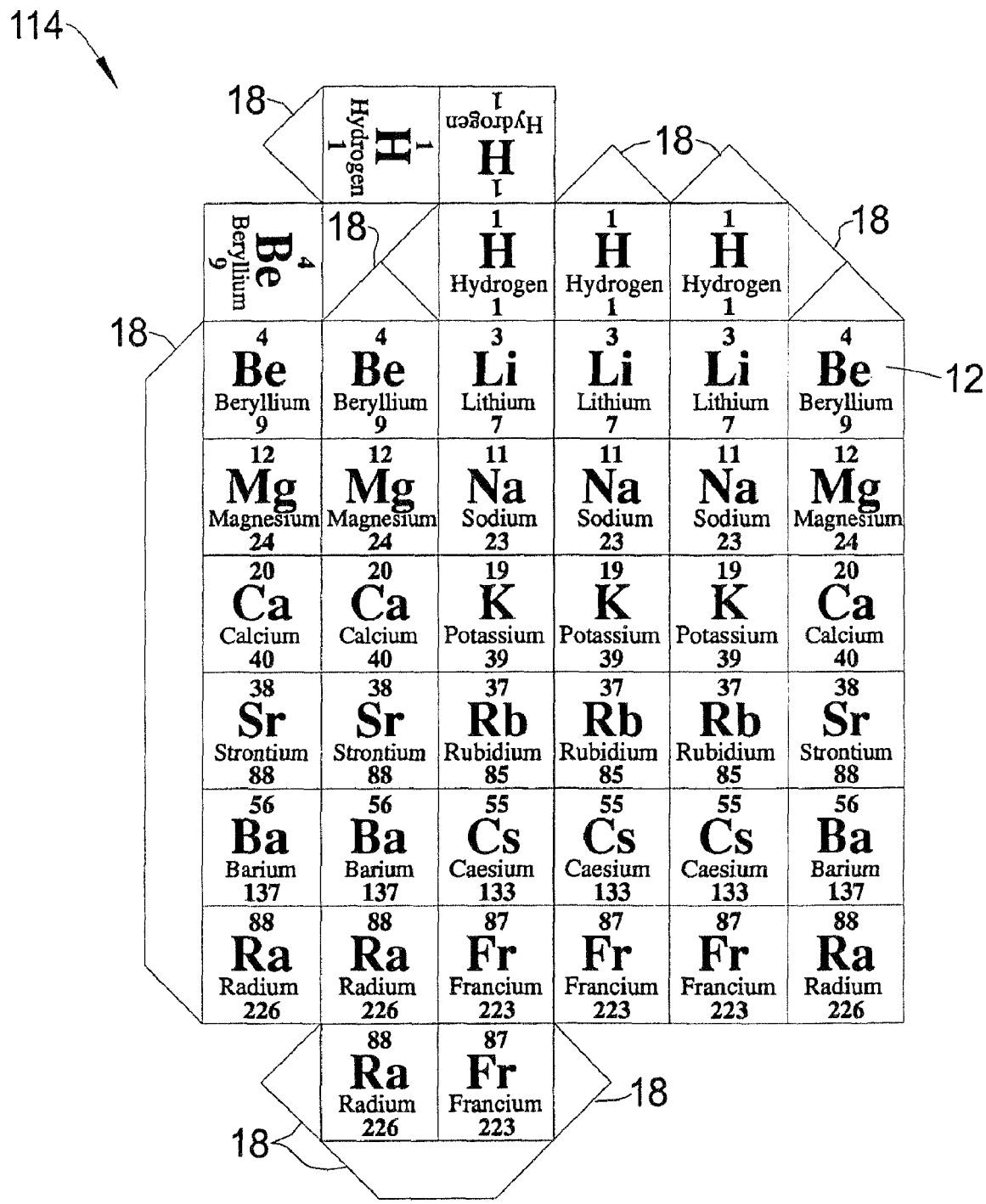
FIGS. 2-5 are plan views of several planar sheet of the present invention.
Figure 3:
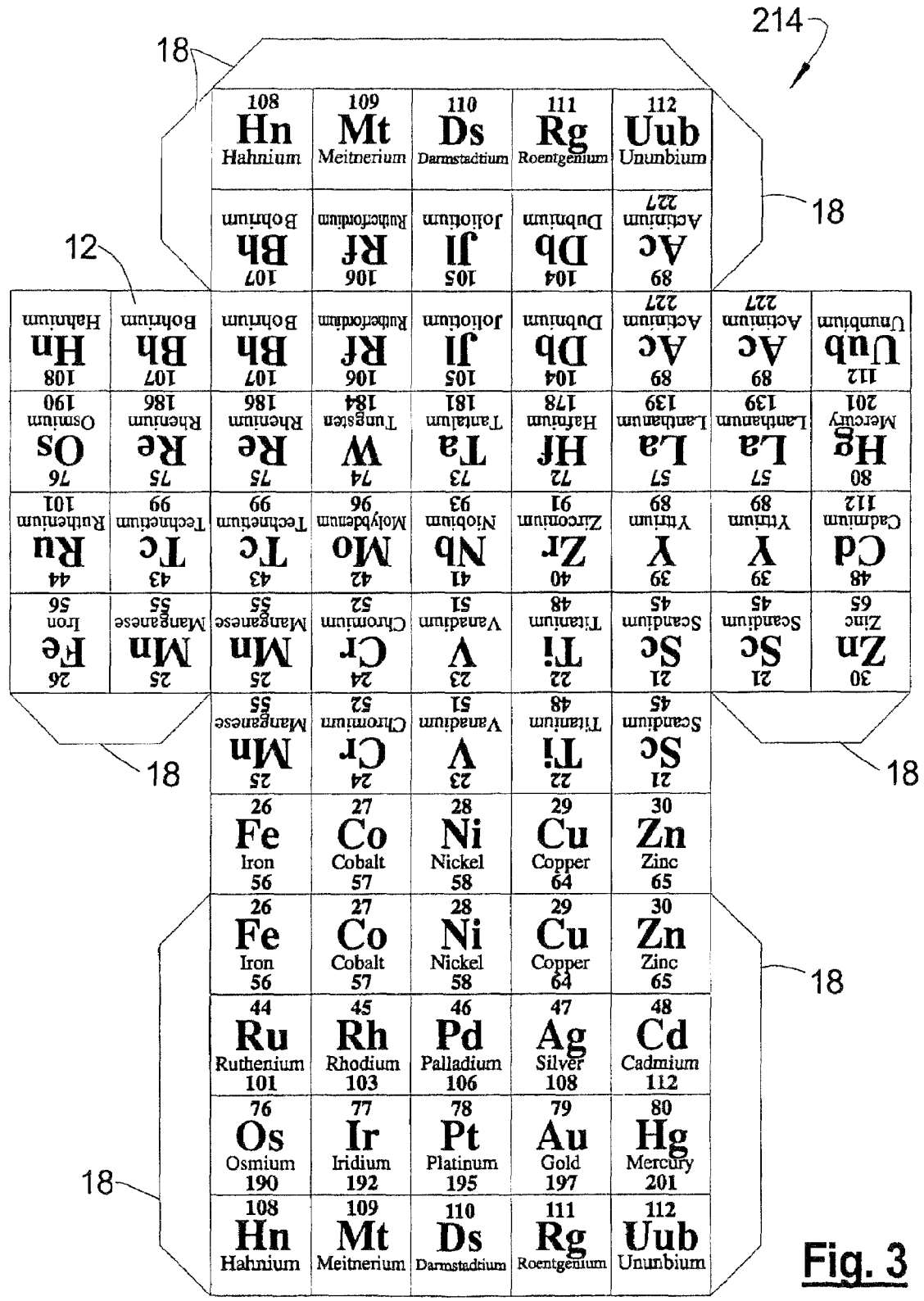
Figure 4:
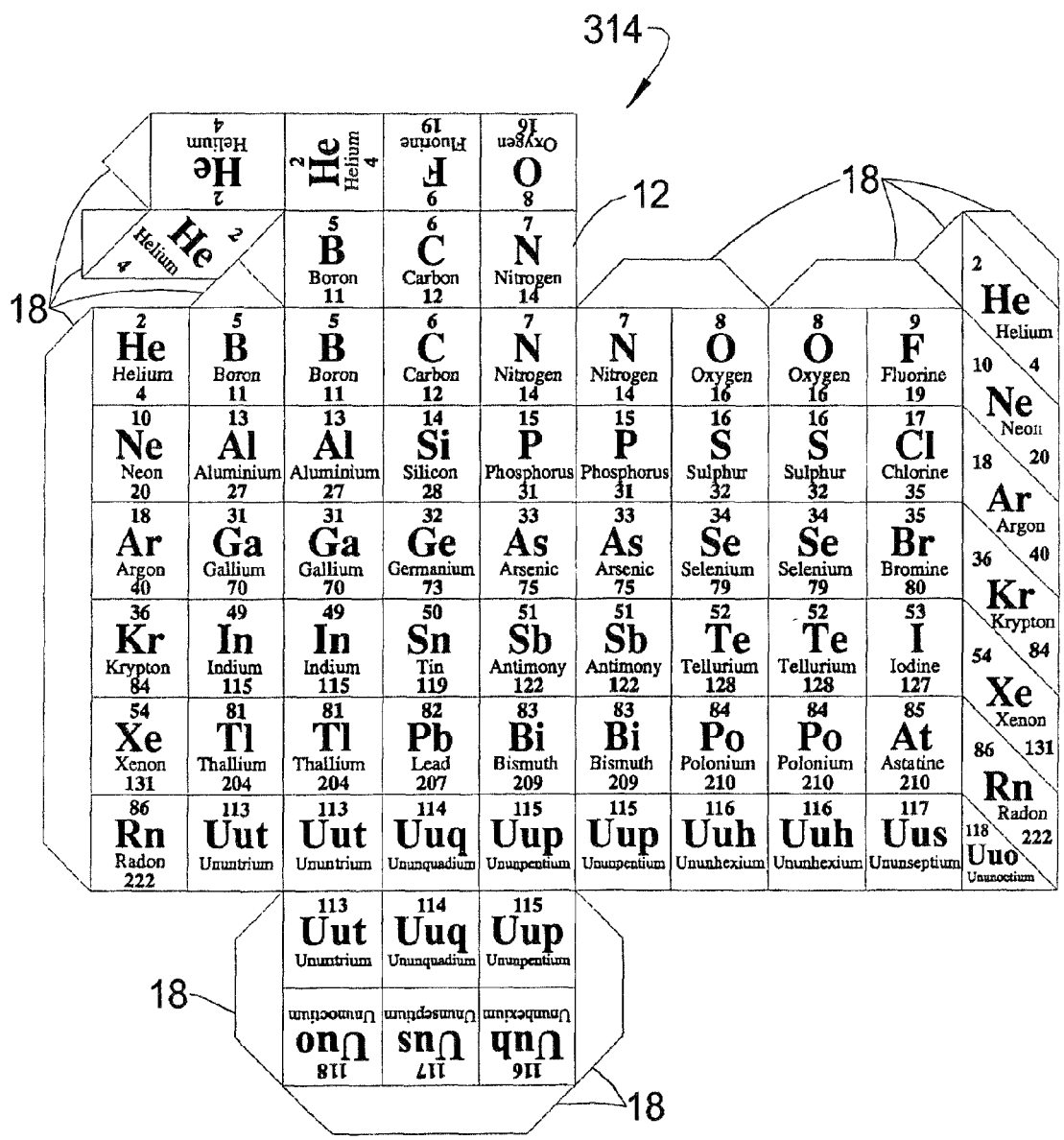
Figure 5:
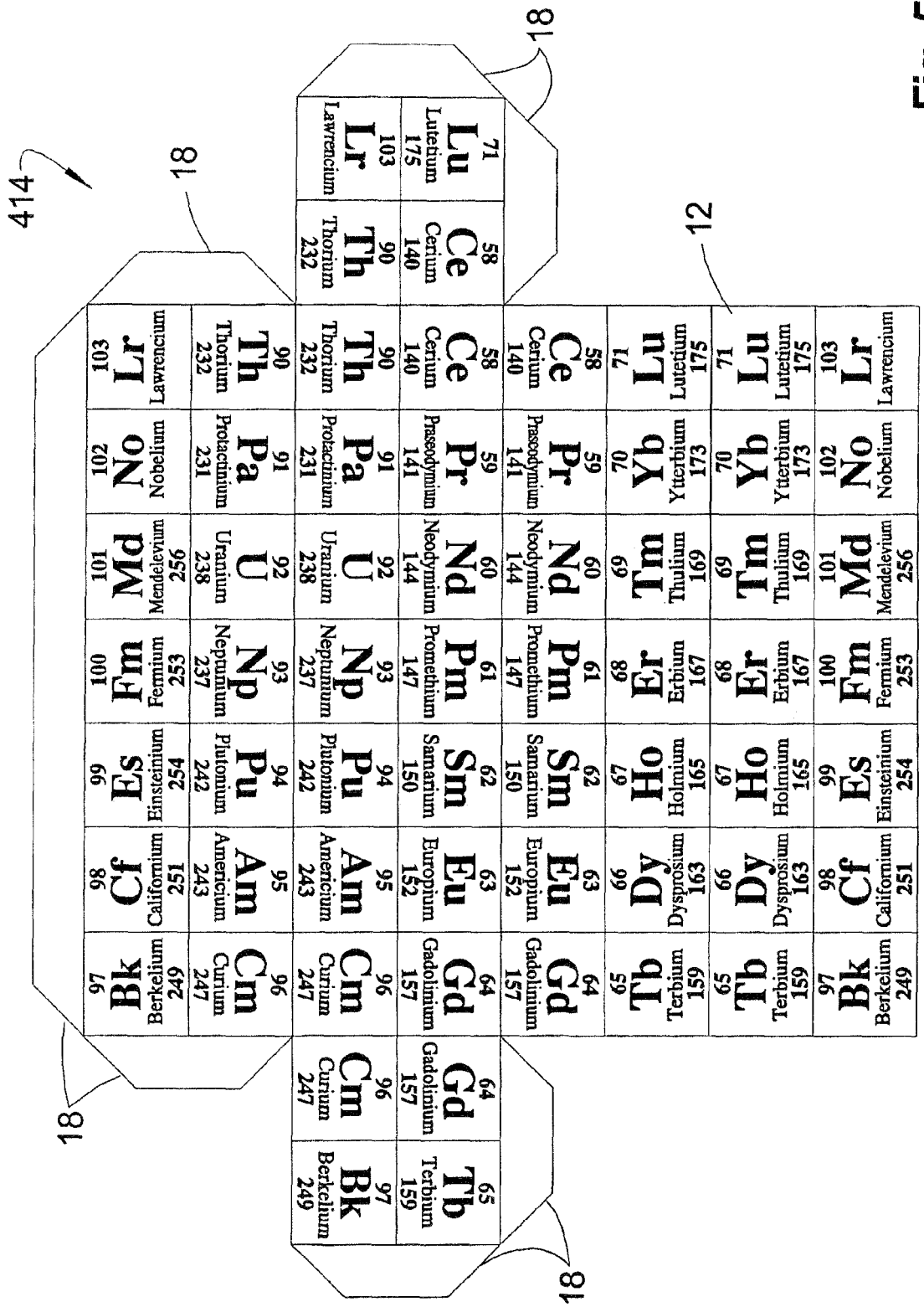

The grouping 114 in FIG. 2 includes the element representations 12 for hydrogen and the elements in groups 1 and 2, respectfully known as the Alkali metals and the Alkaline earth metals. The grouping 214 in FIG. 3 includes the element representations 12 for the transition metals. The grouping 314 in FIG. 4 includes the element representations 12 for groups 3-8, wherein groups 7 and 8 are also known as the Halogens and Noble gases, respectively. Groups 3-6 include some non metals, the metalloids, and some metals. The grouping 414 in FIG. 5 includes the element representations 12 for the transition elements known as the Lanthanides and the Actinides or the Rare Earth/Actinide Groups.

Figure 6:
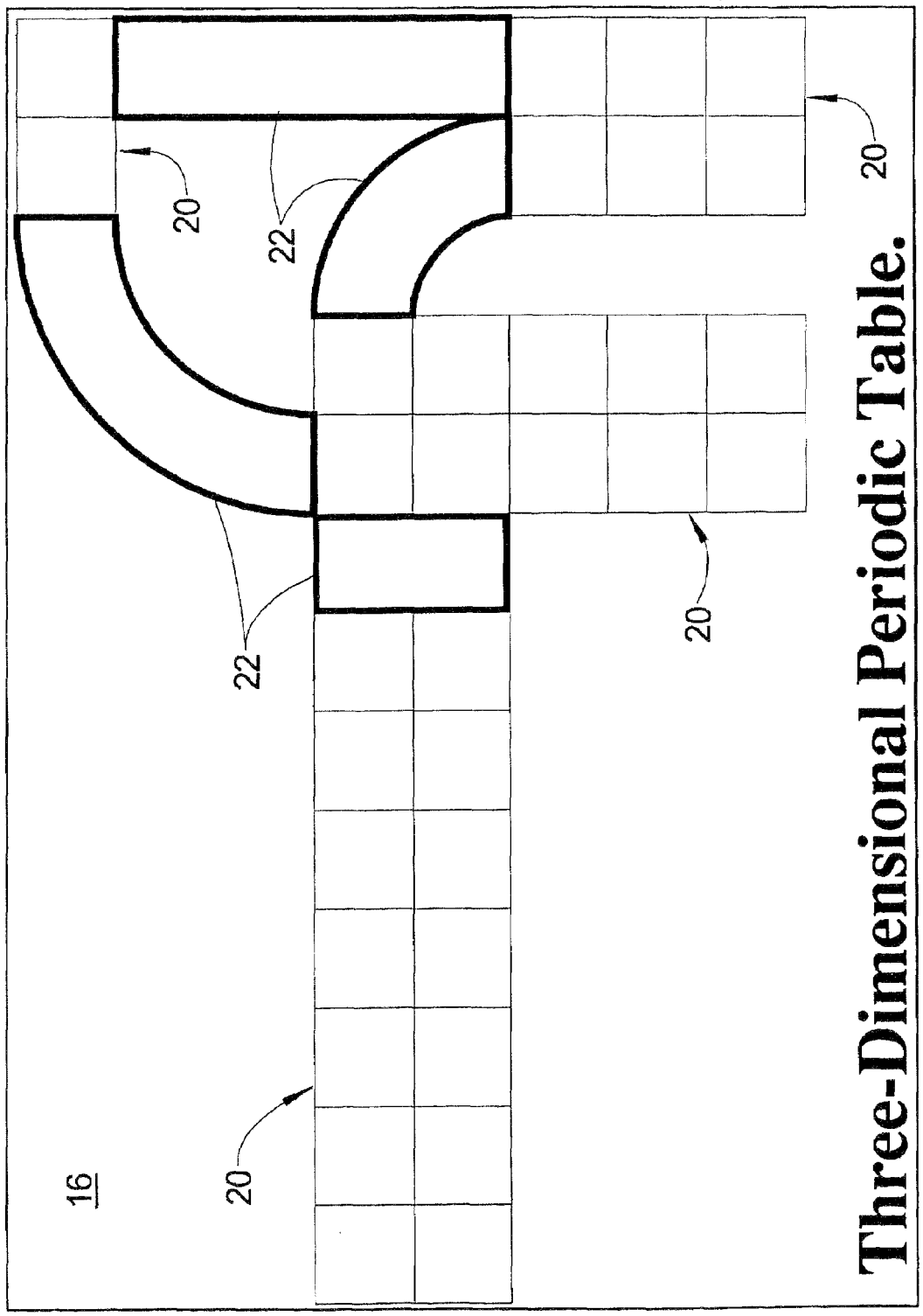
FIG. 6 is a plan view of a planar map of FIG. 1.

The substantially planar map 16, shown in FIG. 6, includes a plurality of grids 20, each of which are in the shape of the footprint of one of the groupings 114, 214, 314, or 414 to indicate the placement of the groupings 14 when in the three dimensional form. Several pathways 22 between each of the grids 20 indicate that the periods are viewed by following the horizontal rows between the groupings 14. For example, period 2 starts with lithium (Li) and beryllium (Be) in grouping 114 and continues to the grouping 314 with boron (B), carbon (C), etc. The viewer knows to skip the grouping 214 because there are no element representations 12 that extend vertically off the planar map 16 to period 2 in the grouping 214. in another example, period 6 starts with cesium (Cs) and barium (Ba) in grouping 114, continues to lanthanum (La) in grouping 214, then to cerium (Ce) through lutetium (Lu) in grouping 414, continues back to grouping 214 with hafnium (Hf) through mercury (Hg), and ends with thallium (Tl) through radon (Rn) in grouping 314. The atomic number included with the element representations aids the viewer in following the periods as well.

In use, a kit containing sheets of the groupings 14 in substantially planar form, the map 16, and a set of instructions are supplied to a student or a group of students. The instructions guide the student through the assembly of the three dimensional periodic table 10. The instructions also include several diagrams, illustrated in FIGS. 7-16, to aid in the assembly. A particular example of such instructions is as follows. It should be noted, however, that the set of instructions included in the kit may vary in detail from the following example.

EXAMPLE 1

Figure 7:
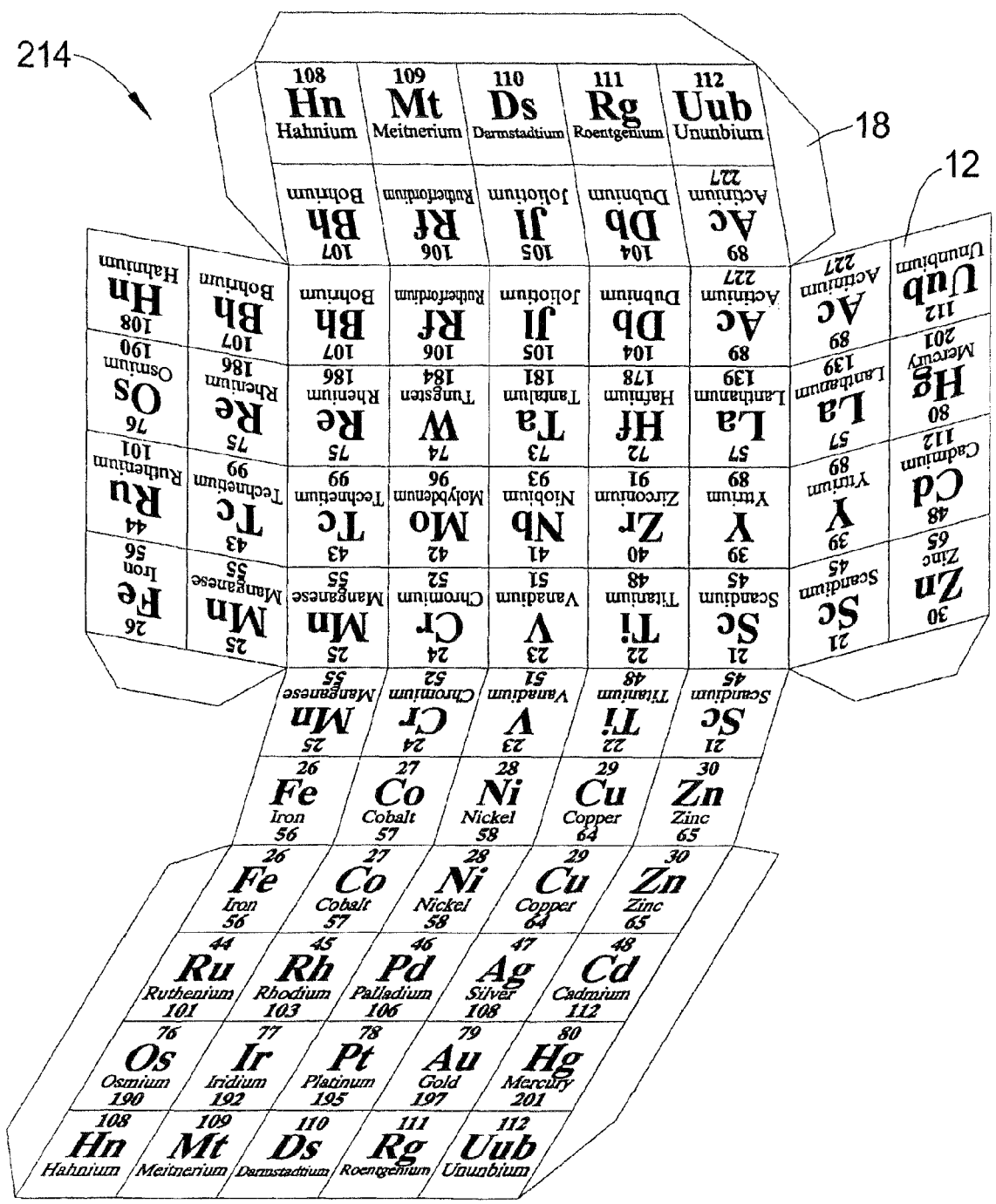

Identify each of the blocks of elements from the four printed.
The two nets which comprise:
a) The Transition Metals (grouping 214) (FIGS. 7 and 8)
b) The Rare Earth/Actinide Groups (grouping 414) (FIGS. 9, 10 and 11) will form rectangular blocks when assembled so begin with these two.
Alter carefully cutting out the net for the Transition Metals (grouping 214), score all the fold lines on the back of the card and then generate sharp folds along each score line, especially adjacent to the tabs 18, as shown in FIG. 7.

Figure 8:
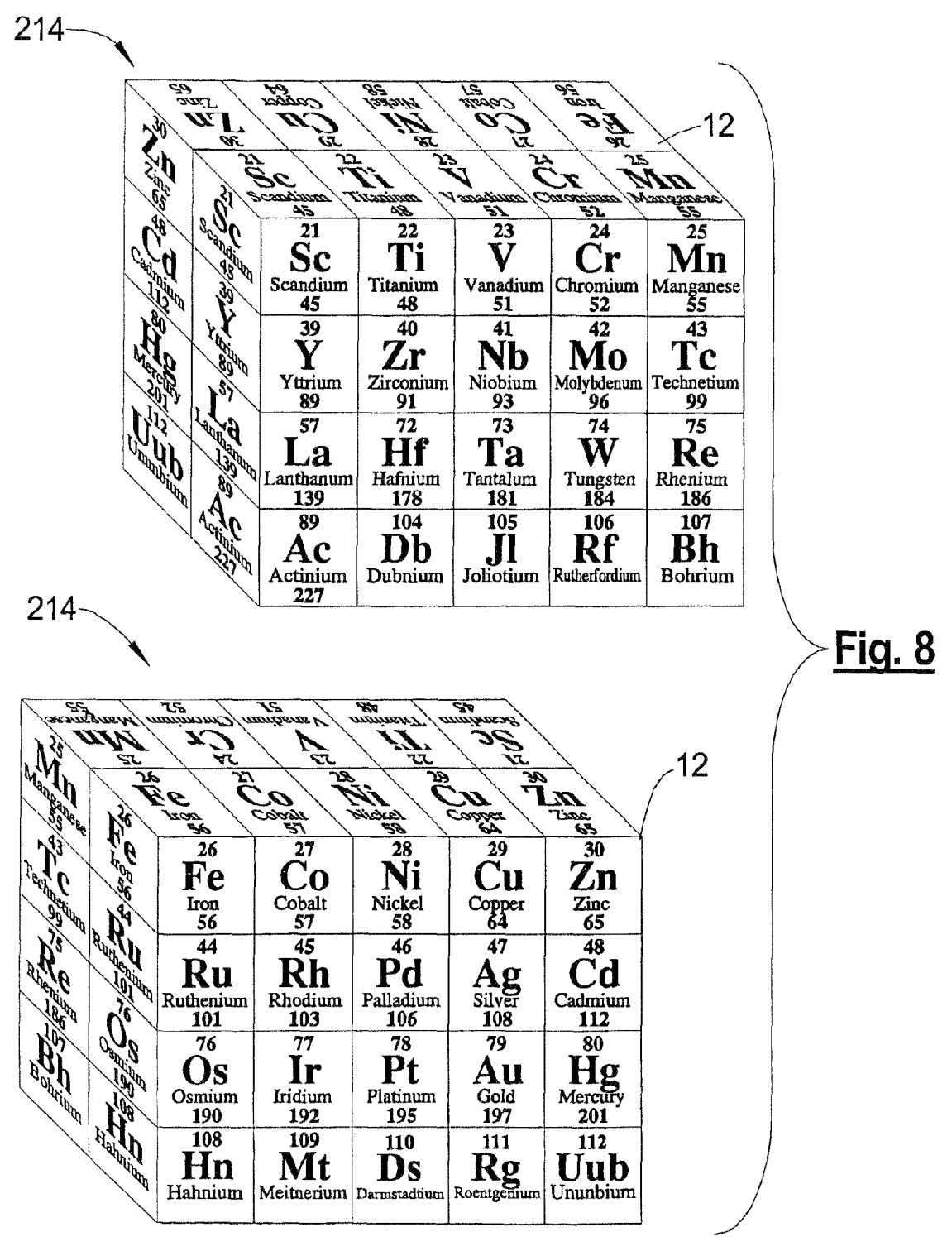

Practice the assembly into a rectangular block before placing any glue on any of the tabs 18, as shown in FIG. 8.

When sure of the final outcome, add a small amount of quick drying glue to each tab 18 and assemble the rectangular block, as shown in FIG. 8.

Figure 9:
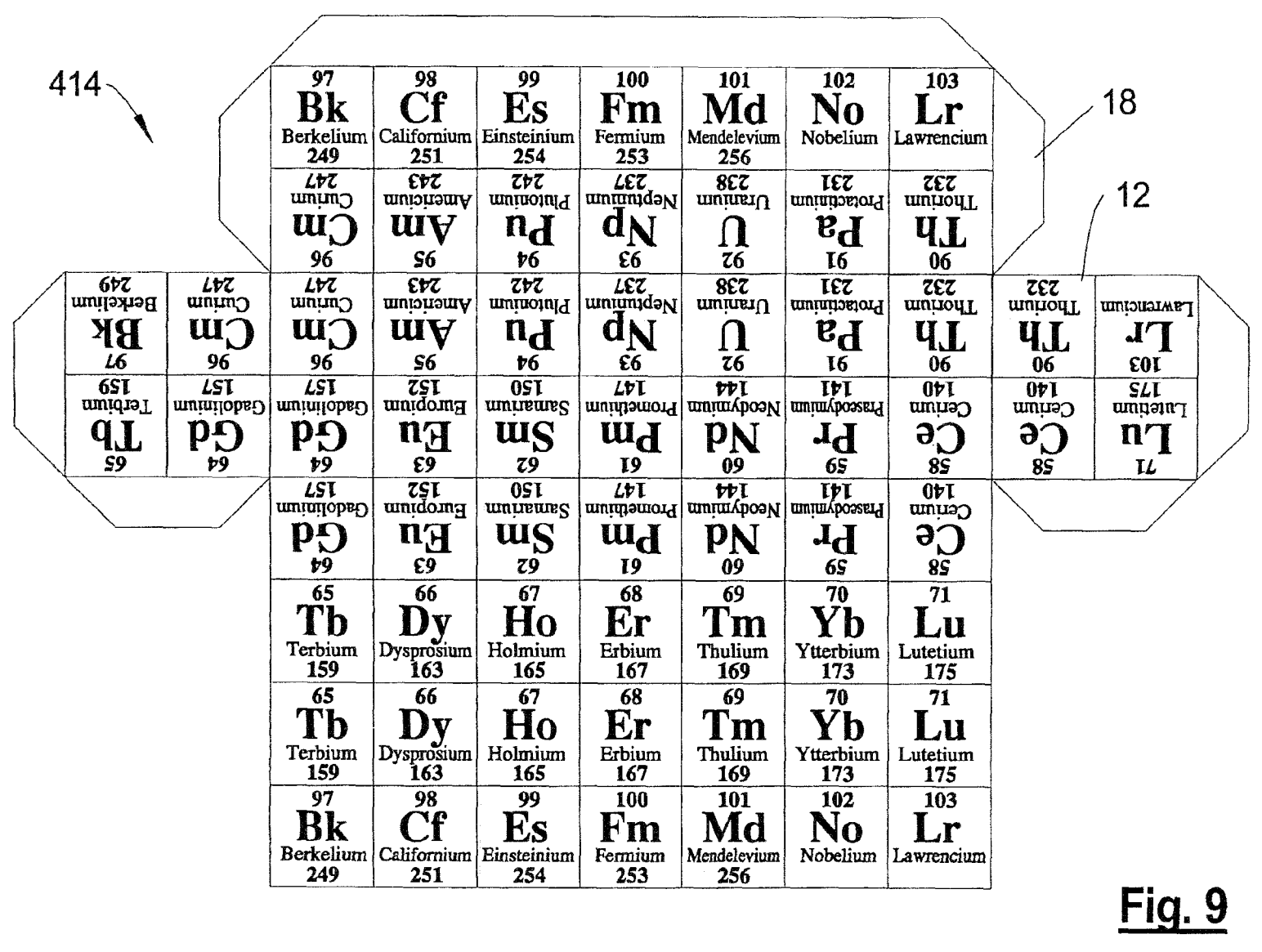

Next, carefully cut out the net for the elements in the Rare Earth/Actinide Groups (grouping 414) shown in FIG. 9.

Figure 10:
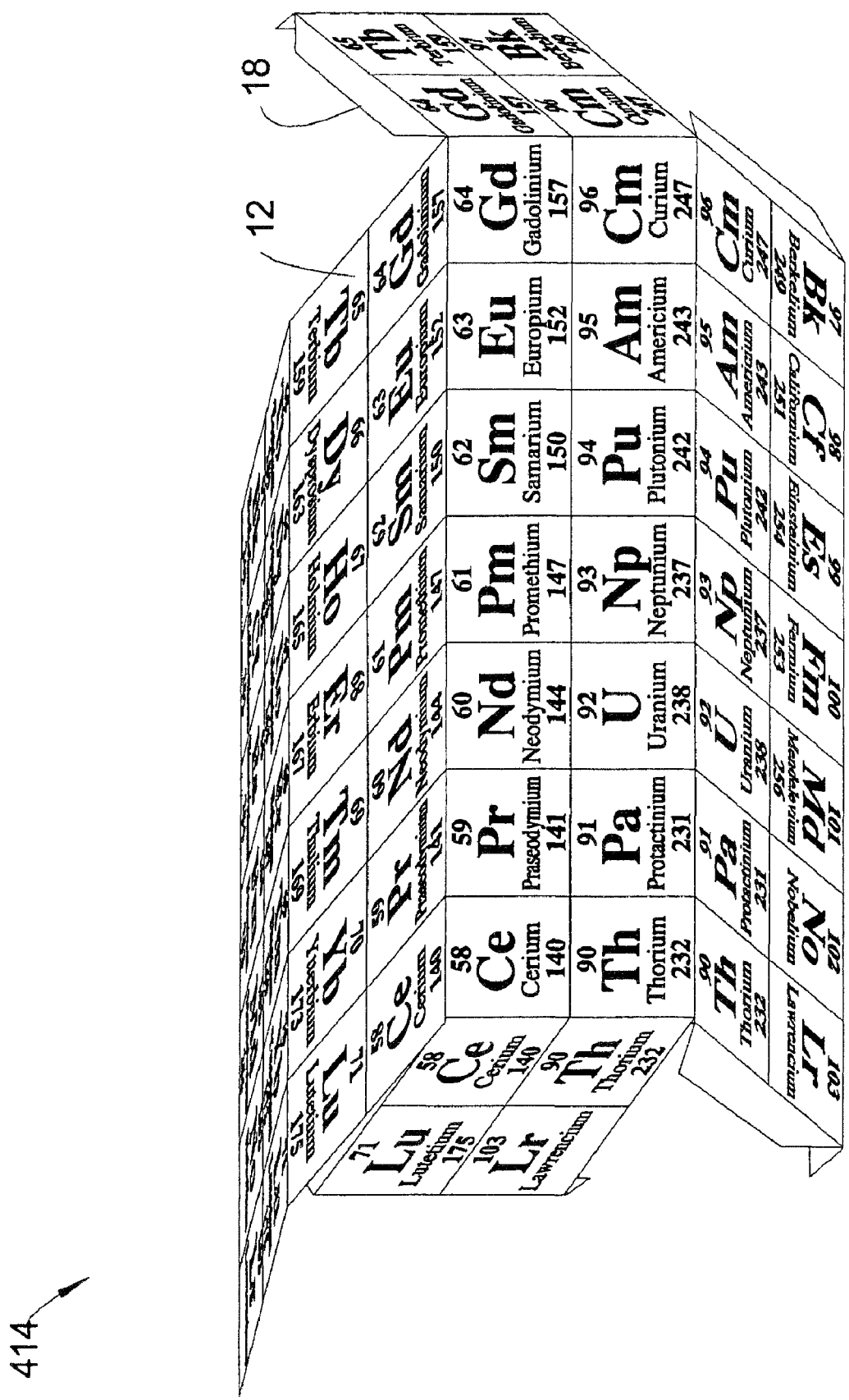

Score all the fold lines on the back of the card and then generate sharp folds along each score line, especially adjacent to the tabs 18, as shown in FIG. 10.

Figure 11:
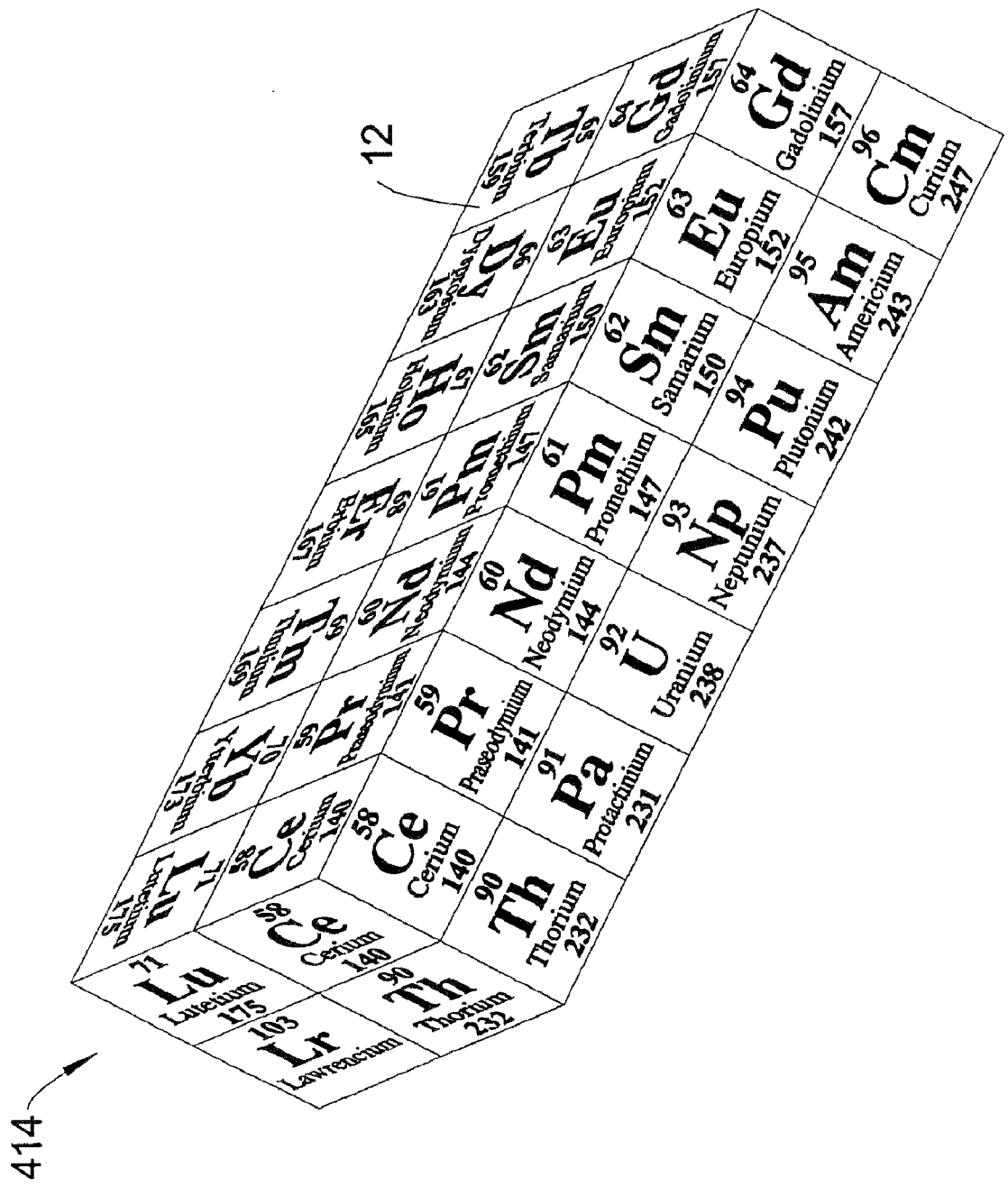

When sure of the final outcome, add a small amount of quick drying glue to each tab 18 and assemble the rectangular block, as shown in FIG. 11.

Figure 12:
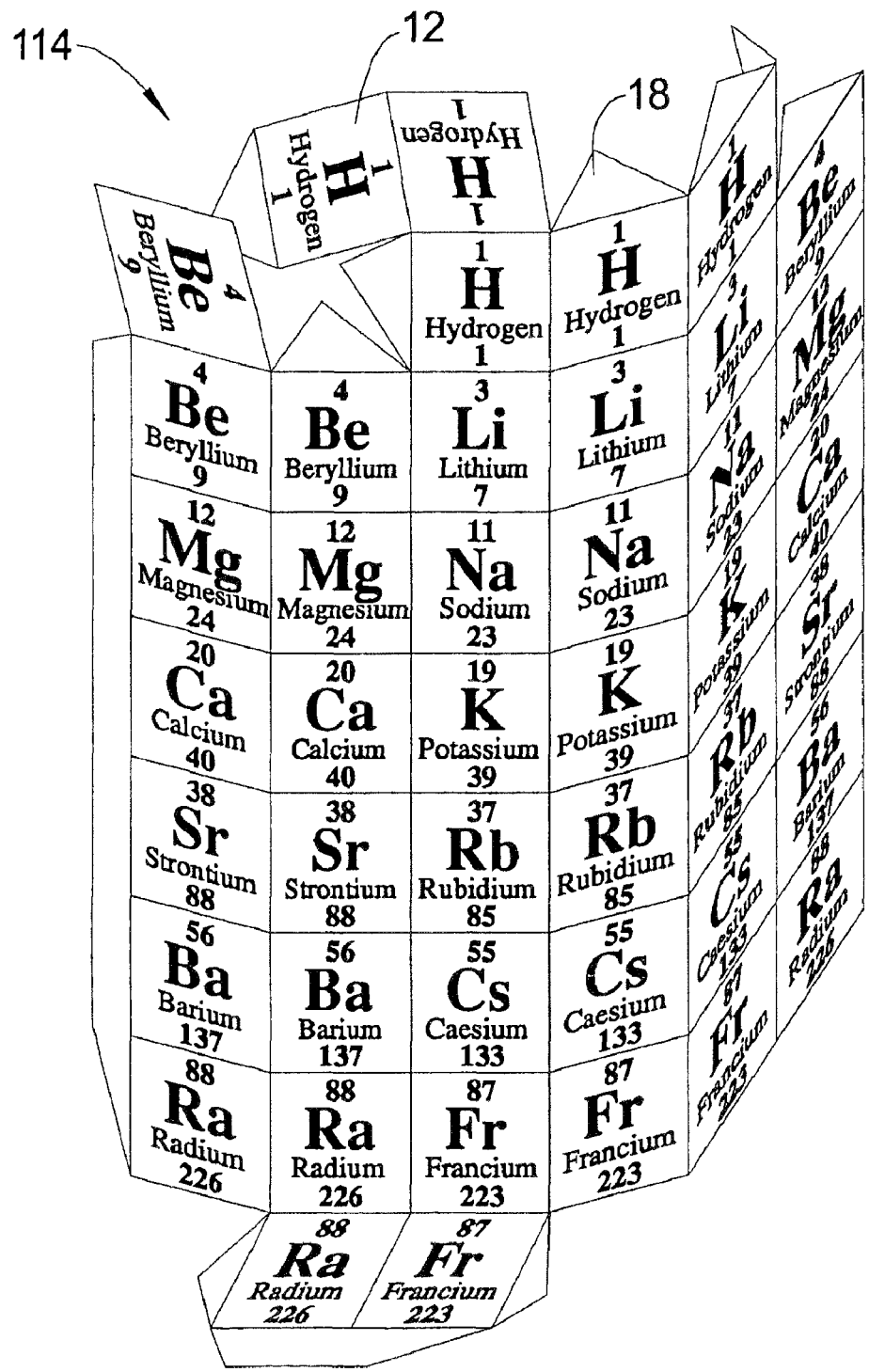

Next, carefully cut out the net for the elements in Groups 1 and 2, together with hydrogen (grouping 114), as shown in FIG. 12. At this stage, do not cut off any tabs 18 in the vicinity of hydrogen.

Score all the fold lines on the back of the card and then generate sharp folds along each score line, especially adjacent to the tabs 18, as shown in FIG. 12.

Practice the assembly into a rectangular block with hydrogen perched on top of lithium. Check where each tab 18 will be glued and positioned and then remove any superfluous tabs 18; double check before cutting.

Figure 13:
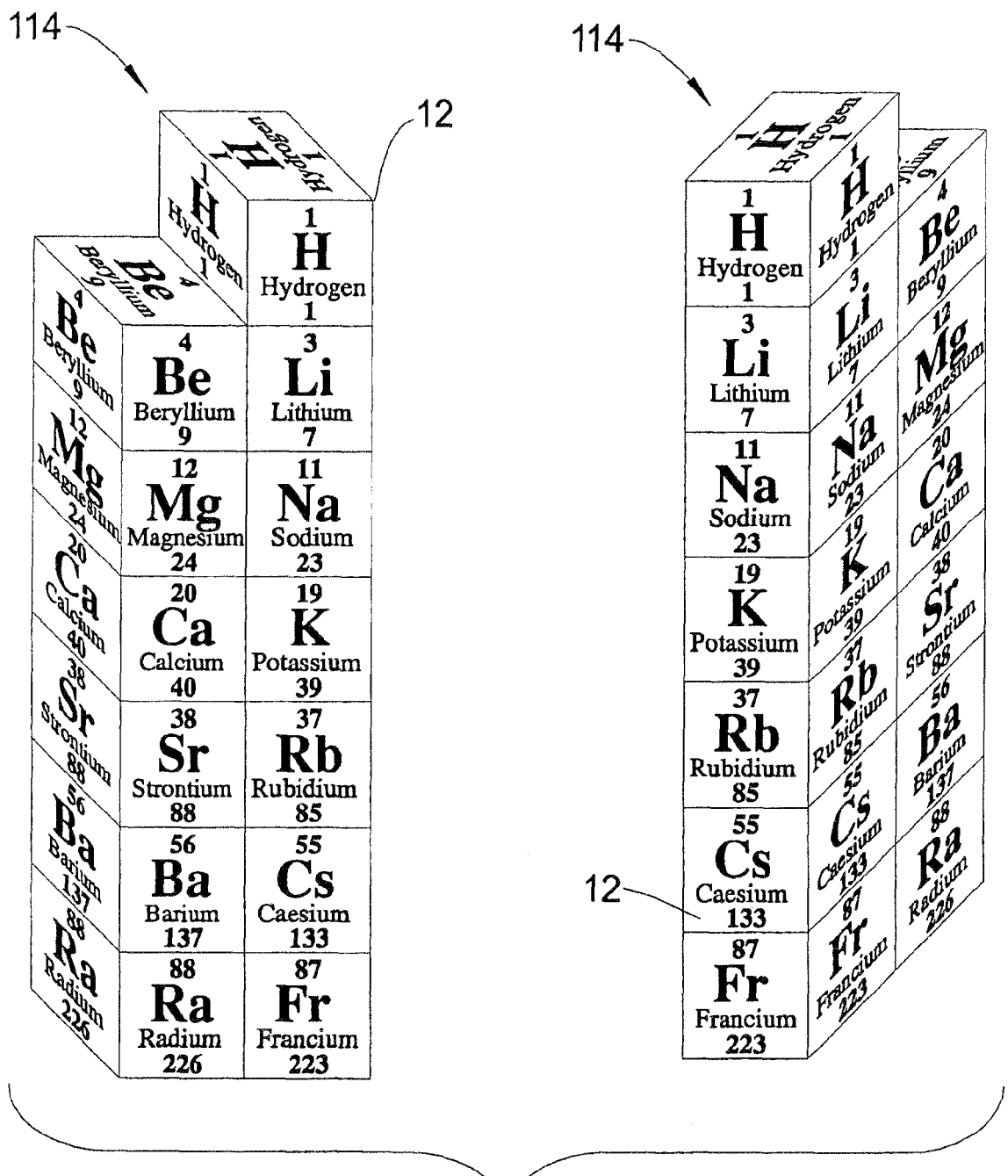

When sure of the final outcome, add a small amount of quick drying glue to each tab 18 and assemble the block for Groups 1 and 2 (grouping 214), as shown in FIG. 13.

Figure 14:
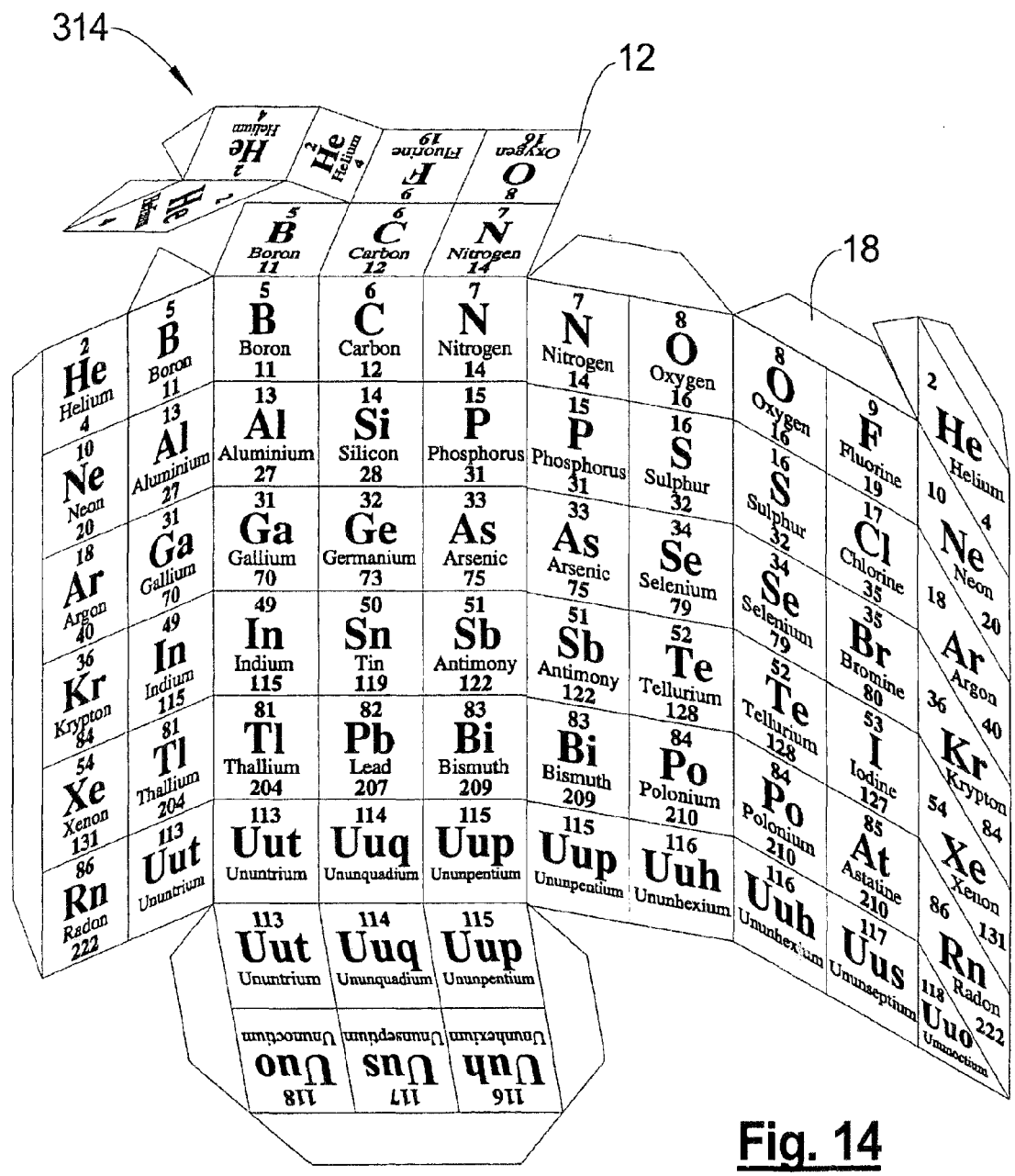

Next, carefully cut out the net for the elements in Groups 3 to 8 (grouping 314) as shown in FIG. 14. At this stage, do not cut off any tabs 18 in the vicinity of helium.

Score all the fold lines on the back of the card and then generate sharp folds along each score line, especially adjacent to the tabs 18, as shown in FIG. 14.

Figure 15:
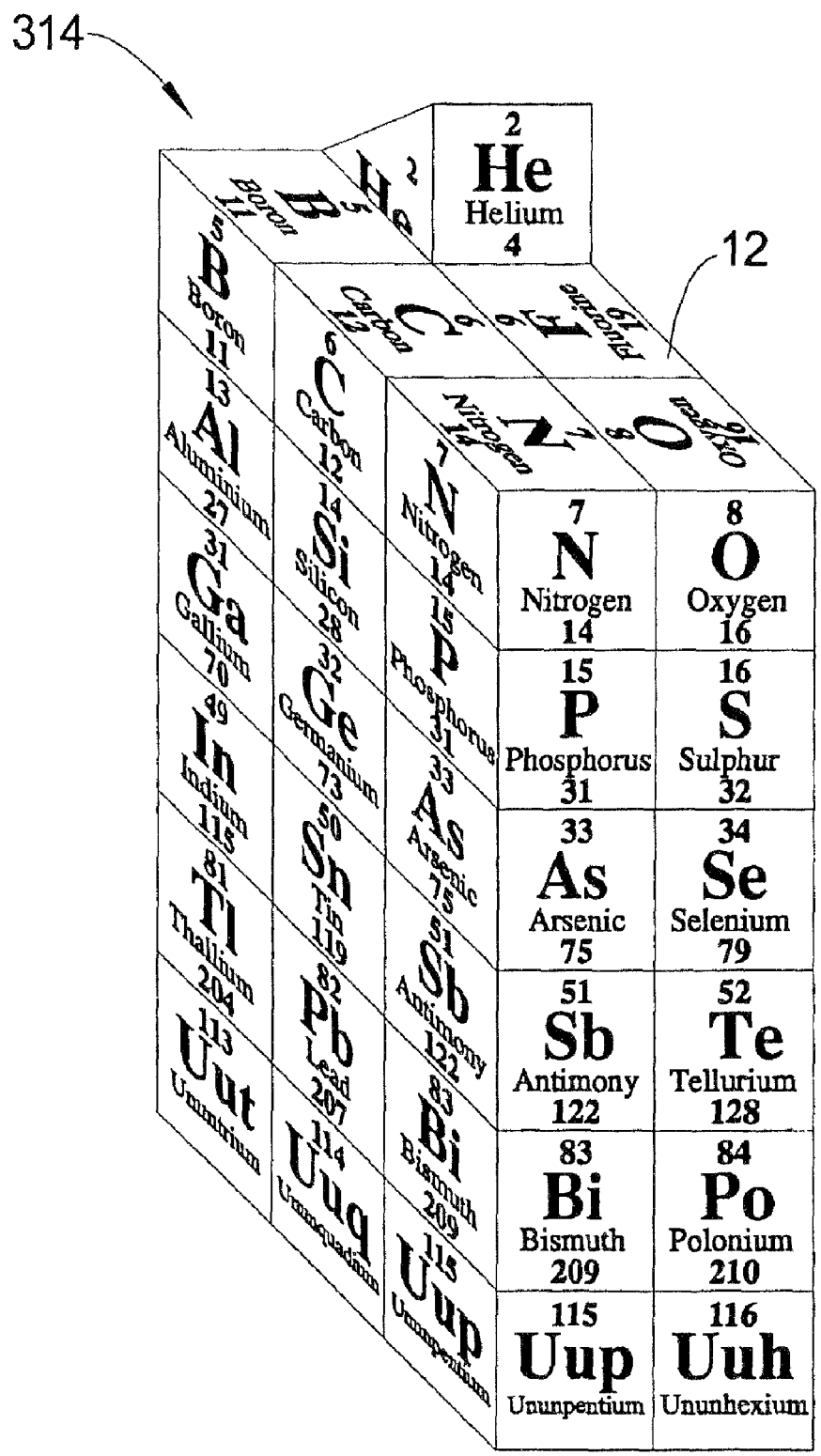

Practice the assembly of the block with the Noble Gases, e.g. helium, slanting downwards to the next Period as shown in FIG. 15. Check where each tab 18 will be glued and positioned and then remove any superfluous tabs 18; double check before cutting.

When sure of the final outcome, add a small amount of quick drying glue to each tab 18 and assemble the block as shown in FIG. 15.

Figure 16:
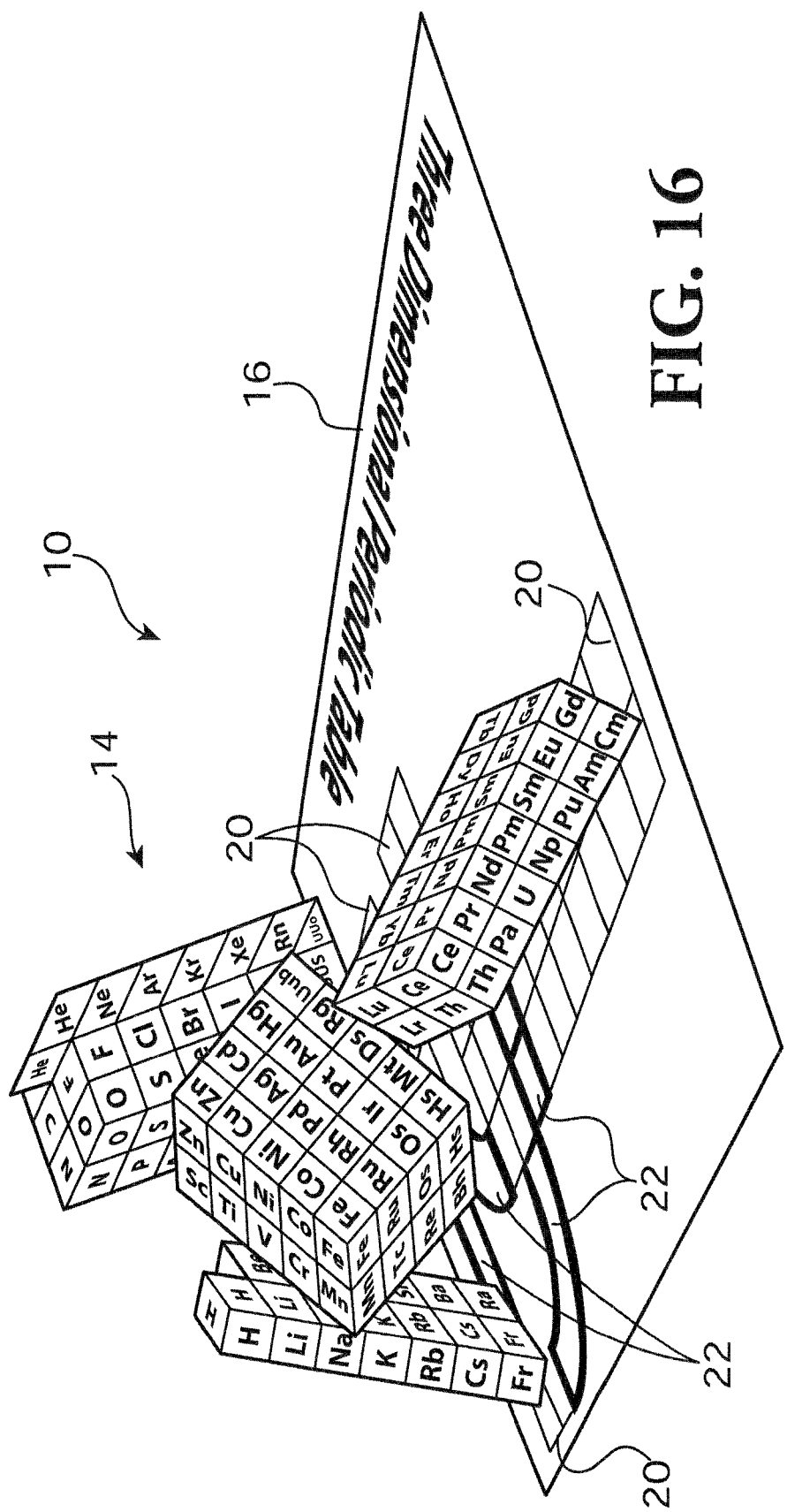

Now that all four blocks of elements have been constructed, position them on the map 16 so that their relative position follows an increasing of atomic number as shown in FIG. 16 and FIG. 1.

The set of instructions may also include several questions to encourage a student to think about the periodic table and the chemical elements. Such questions may include those in the following example. Hints and answers to the questions may also be provided to aid the students.

EXAMPLE 2

Questions: (A few suggestions) (Various Grades, no particular order)
1. Name all the elements in each of Groups 1 to 4.
2. Why do the blocks contain the number of elements per period that they do? (Hint: consider the number of electrons in s, p, d, f-energy levels)
3. Why do the blocks "double back" on themselves? (Hint: Hundt's Rule)
4. Look carefully at some of the coloring of the elements and comment on the colors you find.
5. Look carefully for elements that are found in the molecules of life (fats, proteins, carbohydrates, DNA, RNA, etc) and comment on their relative position considering the large number of elements that exist.
6. List and then find the elements that are present in
   a. an electric cable
   b. a Teflon coated frying pan
   c. a nuclear fuel rod
7. Why aluminum and sulphur rather than aluminum and sulfur?

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

The invention claimed is:

1. A periodic representation of the chemical elements for teaching chemistry structures and principles, comprising four three-dimensional forms including:
   a first block-shaped three-dimensional form that includes elemental representations that correspond to the alkali metals and alkaline earth metals;
   a second block-shaped three-dimensional form that includes elemental representations that correspond to the transition metals;
   a third block-shaped three-dimensional form that includes elemental representations that correspond to the metalloids, halogens and noble gases;
   a fourth block-shaped three-dimensional form that includes elemental representations that correspond to the lanthanides and actinides;
   a substantially planar map configured to be situated beneath the four three-dimensional forms, the map including four grids configured to receive each of the four three-dimensional forms and thereby indicate a particular placement of the four forms to produce periods when the three-dimensional forms are viewed together;
   wherein each of the elemental representations includes information about a particular element selected from the group consisting of atomic symbol, atomic number, atomic mass, the name of the element, the natural state of the element at room temperature and atmospheric pressure and number of valence electrons.

2. A kit for assembling a three-dimensional periodic representation of the chemical elements for teaching chemistry structures and principles, comprising;
   a plurality of substantially planar sheets wherein each of said sheets includes at least one grouping wherein each of said groupings includes a plurality of element representations including information about a particular element, said information being selected from the group consisting of atomic symbol, atomic number, atomic mass, the name of the element, the natural state of the element at room temperature and atmospheric pressure, and the number of valence electrons;
   means for assembling said groupings into four block-shaped three-dimensional forms each of which includes a differently shaped footprint that is two element representations thick, each of said three-dimensional forms representing at least one of said groupings, said groupings being selected from the group consisting of (1) Alkali metals and Alkaline earth metals (2) transition metals (3) metalloids, halogens, and Noble gases and (4)

Lanthanides and Actinides, thereby producing an Alkali metals and Alkaline earth metals form with a two-element by one-element footprint, a transition metal form with a five-element by two-element footprint, a metalloid, halogen and Nobel gases form with a three-element by two-element footprint and a Lanthanide and Actinide form with a seven-element by two-element footprint;

wherein said element representations are configured to form a plurality of periodic rows when said three-dimensional forms are viewed together in a particular order;

a substantially planar map wherein said map includes four grids, each of which has a dimension selected to correspond to the footprint of one of the corresponding three-dimensional forms configured to indicate a particular arrangement of three-dimensional forms; and a set of instructions for assembling the groupings into a plurality of three-dimensional forms.

3. The kit of claim 2, wherein each of said groupings is operable to be cut out of said sheets along an outer boundary.

4. The kit of claim 2, wherein the means for assembling said three-dimensional forms includes each of said groupings being operable to be folded into a three-dimensional form by folding between certain element representations; and at least one tab attached to at least one of said element representations wherein said tab is configured to affix at least one of said element representations to at least one different element representation.

5. The kit of claim 2, wherein said map includes pathways between the grids that aide in the viewing of the periods formed by the arrangement of said element representations.

6. The kit of claim 2, wherein said set of instructions comprises a plurality of questions about the elements.

7. A method of teaching a student about the chemical elements, comprising the steps of:

obtaining a plurality of sheets, each of said sheets having a plurality of elemental representations printed thereon in one or more groupings comprising information about a particular element, said information being selected from the group consisting of atomic symbol, atomic number, atomic mass, the name of the element, the natural state of the element at room temperature and atmospheric pressure, and the number of valence electrons the sheets having a plurality of tabs in communication with each of the groupings;

providing a set of instructions for creating four three-dimensional block-shaped forms from said sheets, the forms consisting of (1) an Alkali metals and Alkaline earth metals form (2) a transition metals form (3) a metalloids, halogens, and Noble gases form and (4) a Lanthanides and Actinides form, wherein each form includes a footprint that is two elemental representations thick, the footprint of each form being different from the footprints of the other forms;

cutting out the groupings from said sheets according to said instructions;

assembling the groupings into the four three-dimensional block-shaped forms according to said instructions;

providing a substantially planar map configured to be situated beneath said three-dimensional forms wherein said map includes four grids, each of which has a different dimension that corresponds to the footprint of one of the corresponding four three-dimensional forms, the four grids being configured to indicate a particular arrangement of said three-dimensional forms;

placing each of the four three-dimensional forms in its corresponding grid and observing the elemental representations in the same and different groupings as well as periods formed by said three-dimensional forms when said three-dimensional forms are placed on said substantially planar map and viewed together in the particular arrangement.

8. The periodic representation of the chemical elements of claim 1, wherein said map includes pathways between the grids that aide in the viewing of the periods formed by the arrangement of said element representations.

9. The method as recited in claim 7, wherein the Alkali metals and Alkaline earth metals form footprint is two element representations thick and one elemental representation long and the planar map has a corresponding first grid whose dimensions match the Alkali metals and Alkaline earth metals form footprint.

10. The method as recited in claim 9, wherein the transition metals form includes a region that is two element representations thick and five elemental representations long and the planar map has a corresponding second grid whose dimensions match the transition metals form footprint.

11. The method as recited in claim 10, wherein the metalloids, halogens, and Noble gases form footprint is two element representations thick and three elemental representations long and the planar map has a corresponding third grid whose dimensions match the metalloids, halogens, and Nobel gases form footprint.

12. The method as recited in claim 11, wherein the Lanthanides and Actinides form footprint is two element representations thick and seven elemental representations long and the planar map has a corresponding fourth grid whose dimensions match the Lanthanides and Actinides form footprint.

* * * * *